United States Patent [19]

Henrich et al.

[11] 4,245,314

[45] Jan. 13, 1981

[54] OXYGEN SENSOR QUALIFIER

[75] Inventors: Robert S. Henrich, Farmington Hills; Thomas W. Hartford, Livonia; James A. Kessler, Troy, all of Mich.

[73] Assignee: The Bendix Corporation, Southfield, Mich.

[21] Appl. No.: 881,922

[22] Filed: Feb. 27, 1978

[51] Int. Cl.[3] .................. F02B 75/10; F02D 28/00; G01N 31/00
[52] U.S. Cl. .................. 364/431; 73/1 G; 60/276; 123/453; 364/551
[58] Field of Search .............. 364/424; 60/276, 285; 123/32 EA, 32 EE, 119 EC, 32 EC, 32 ED; 73/1 G

[56] References Cited

U.S. PATENT DOCUMENTS

| | | | |
|---|---|---|---|
| Re. 29,741 | 8/1978 | Norimatsu et al. | 364/431 |
| 3,745,768 | 7/1973 | Zechnall et al. | 60/276 |
| 3,938,075 | 2/1976 | Reddy | 60/285 |
| 3,948,228 | 4/1976 | Luchaco | 60/276 |
| 3,949,551 | 4/1976 | Eichler et al. | 60/285 |
| 4,094,186 | 6/1978 | Wessel | 123/32 EE |
| 4,096,834 | 6/1978 | Norimatsu et al. | 123/32 EE |
| 4,103,649 | 8/1978 | Matumoto et al. | 123/32 EE |
| 4,106,450 | 8/1978 | Norimatsu et al. | 123/32 EE |
| 4,117,815 | 10/1978 | Ikeura | 123/32 EE |
| 4,121,554 | 10/1978 | Sueishi et al. | 123/32 EE |
| 4,130,095 | 12/1978 | Bowler et al. | 123/32 EE |
| 4,132,193 | 1/1979 | Takase et al. | 123/32 EE |
| 4,132,200 | 1/1979 | Asano et al. | 123/32 EE |
| 4,140,085 | 2/1979 | Rabus et al. | 123/32 EE |
| 4,167,163 | 11/1979 | Möder | 123/119 EC |
| 4,172,432 | 10/1979 | Wessel et al. | 123/32 EE |

*Primary Examiner*—Felix D. Gruber
*Attorney, Agent, or Firm*—Gaylord P. Haas, Jr.; Russel C. Wells

[57] ABSTRACT

A method and apparatus for controlling the various functions of an internal combustion engine using a program-controlled microprocessor system having a memory preprogrammed with various control laws and associated control schedules receives information concerning one or more engine-operating parameters such as manifold pressure, throttle position, engine coolant temperature, air temperature, engine speed or period, and the like. These parameters are sensed and then supplied to input circuits for signal conditioning and conversion into digital words usable by the microprocessor system. The microprocessor system computes a digital command word indicative of a computer-commanded engine control operation and output circuitry responds to predetermined computer-generated commands and to the computed digital command word for converting them to corresponding pulse-width control signals for controlling such engine operations as fuel-injection, ignition timing, proportional and/or on-off EGR control, and the like.

In particular an oxygen sensor qualifier system is described wherein the quality of the sensor is determined during engine operation.

10 Claims, 2 Drawing Figures

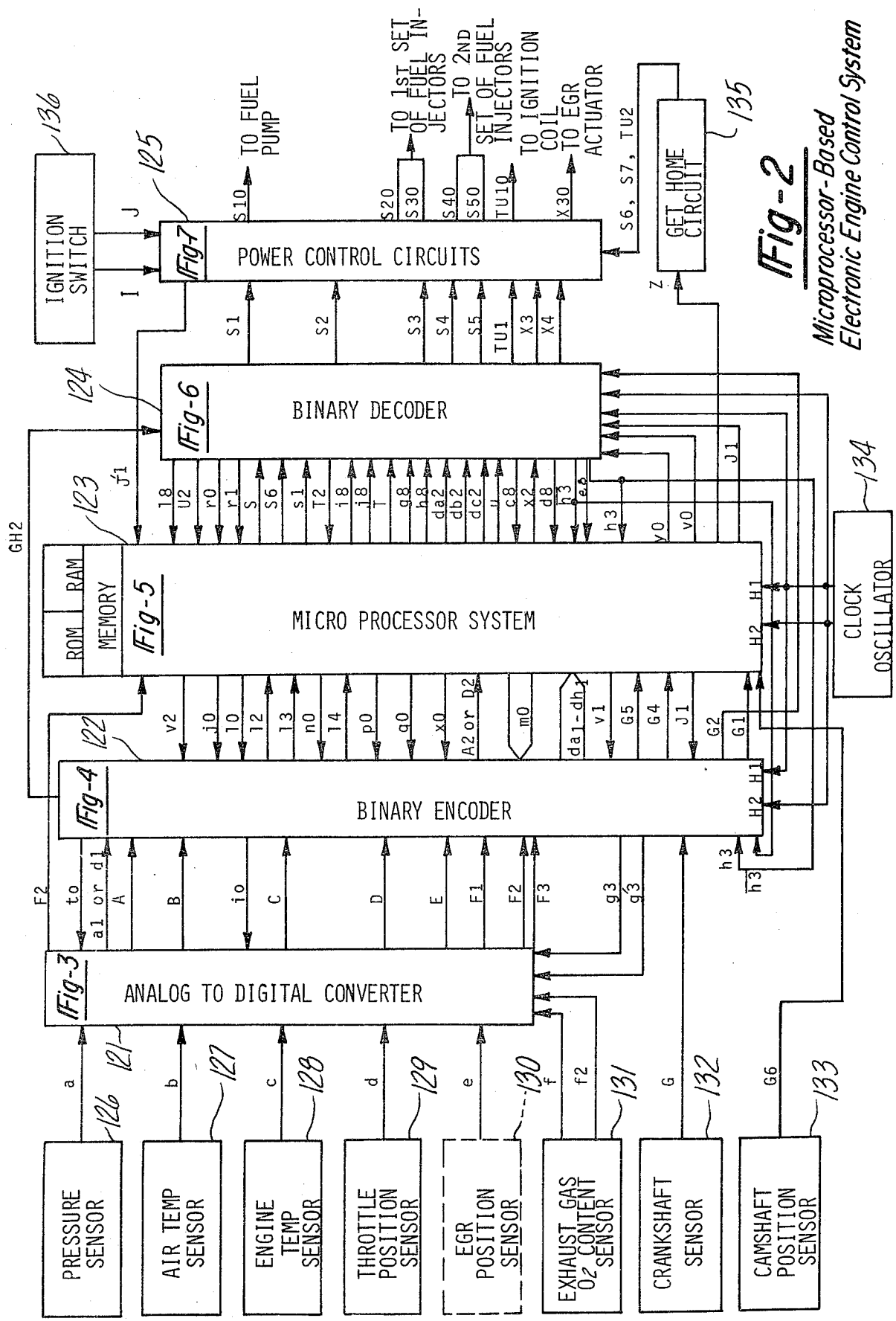

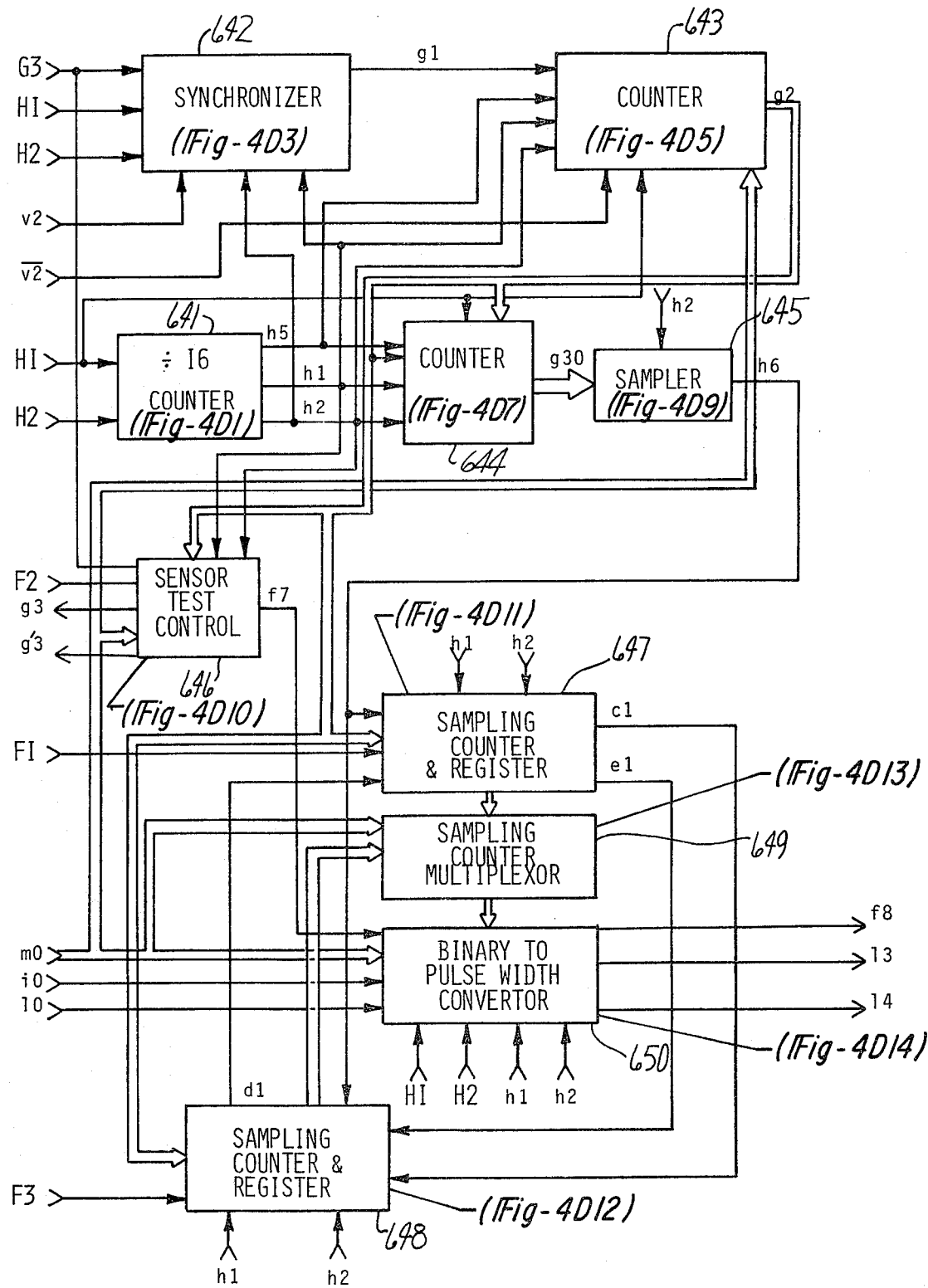

OXYGEN SENSOR QUALIFIER

BACKGROUND OF THE INVENTION

1. Field of the Invention

This invention relates generally to a method and apparatus for controlling an internal combustion engine, and more particularly to a microprocessor-based electronic engine control system having a memory preprogrammed with various control laws and control schedules responsive to one or more sensed engine-operating parameters for generating signals for controlling fuel injection, ignition timing, EGR control, or the like.

2. Statement of the Prior Art

Many of the patents of the prior art recognize the need for employing the enhanced accuracy of digital control systems for more accurately controlling one or more functions of an internal combustion engine.

U.S. Pat. No. 3,969,614 which issued to David F. Moyer, et al on July 13, 1976 is typical of such systems as are U.S. Pat. No. 3,835,819 which issued to Robert L. Anderson, Jr. On Sept. 17, 1974; U.S. Pat. No. 3,904,856 which issued to Louis Monpetit on Sept. 9, 1975; and U.S. Pat. No. 3,906,207 which issued to Jean-Pierre Rivere, et al on Sept. 16, 1975. All of these Patents represent a break-away from the purely analog control systems of the past, but neither the accuracy, reliability, or number of functions controlled is sufficient to meet present day requirements.

Future internal combustion engines will require that emissions be tightly controlled due to ever-increasing governmental regulations, while fuel consumption is minimized and drivability improved over the entire operating range of the engine. None of the systems of the prior art provide a method and apparatus for controlling the operation of an internal combustion engine over even a portion of its operating range with sufficient accuracy to attain minimal emissions and minimal fuel consumption while simultaneously improving drivability.

The engine control systems of the prior art do not normally employ oxygen feedback systems to control engine-operating functions since the oxygen sensor's impedance varies as a function of its operating temperature and the signal is only valid when the oxygen sensor has reached a pre-determined minimum temperature, for example 300 degrees Centigrade. Therefore, measurement of the sensor's impedance will indicate its cold temperature, however, the impedance at this temperature is normally quite high and previous methods used to measure the impedance of the sensor for test purposes usually masked the sensor operation or sensor output signal during this transition period. As the sensor temperature increases and the impedance falls, the impedance measuring mechanism doesn't mask the sensor signal so it is precisely at the high sensor impedance point and at or near the pre-determined minimum operating temperature that an accurate sensor impedance test signal is desired.

The system of the present invention avoids the problems of the prior art and alleviates the problem of the test impedance masking sensor operation.

SUMMARY OF THE INVENTION

The method and apparatus of the present invention employs means for eliminating the interaction of the sensor impedance measuring scheme and the sensor output signal itself by applying a current source to the oxygen sensor periodically to determine the temperature condition impedance of the sensor. The monitoring of the sensor condition is preferably a very small duty cycle of the overall sensor operation. The method employed is to periodically derive a switching signal which is one or two engine revolutions in duration. This test sampling period may be used to identify the condition of the oxygen sensor and transmit to other networks a binary signal level indicative of sensor reliability. Should the sensor impedance be too high, indicating a cold sensor, an "inhibit" signal would be produced until the sensor impedance is again tested during the next periodic test sampling period. Should the oxygen sensor impedance drop to indicate an active sensor, the network indicates the active sensor status to the microprocessor system with a binary signal level of the opposite state thereby indicating that the oxygen sensor output signals may be conditioned for subsequent use without masking the sensor impedance testing scheme.

INCORPORATION BY REFERENCE

This application is one of fourteen applications filed on Feb. 27, 1978, all commonly assigned and having substantially the same specification and drawings, the fourteen applications being identified below:

| Serial Number | Title |
| --- | --- |
| 881,321 | Microprocessor-Based Electronic Engine Control System |
| 881,322 | Feedback-Compensated Ramp-Type Analog to Digital Converter |
| 881,323 | Input/Output Electronic For Microprocessor-Based Engine Control System |
| 881,324 | Switching Control of Solenoid Current in Fuel Injection Systems |
| 881,921 | Dual Volatage Regulator With Low Voltage Shutdown |
| 881,922 | Oxygen Sensor Qualifier |
| 881,923 | Ratiometric Self-Correcting Single Ramp Analog To Pulse Width Modulator |
| 881,924 | Microprocessor-Based Engine Control System Acceleration Enrichment Control |
| 881,925 | Improvements in Microprocessor-Based Engine Control Systems |
| 881,981 | Oxygen Sensor Feedback Loop Digital Electronic Signal Integrator for Internal Combustion Engine Control |
| 881,982 | Improvements In Electronic Engine Controls System |
| 881,983 | Electronic Fuel Injection Compensation |
| 881,984 | Ignition Limp Home Circuit For Electronic Engine Control Systems |
| 881,985 | Oxygen Sensor Signal Conditioner |

Application Ser. No. 881,321, has been printed in its entirety, including FIGS. 1 to 10.34 and the specification of that application is specifically incorporated by reference.

BRIEF DESCRIPTION OF THE DRAWINGS

FIG. 2 is a block diagram of the microprocessor-based electronic engine control system.

FIG. 4D is a block diagram of the oxygen system integrator circuitry.

For a better understanding of the drawing figures in this application, reference is made to the same figure numbers in the above mentioned application, Ser. No. 881,321.

We claim:

1. In an internal combustion engine having an intake system, an exhaust system, an engine block, a plurality of cylinders disposed in the engine block, a piston mounted for reciprocal movement within each of the plurality of cylinders, means responsive to first command signals for controlling the quantity of air supplied to a selected one or more of the plurality of cylinders, means responsive to second command signals for controlling the quantity of fuel supplied to a selected one or more of the plurality of cylinders, means responsive to third command signals for controlling the ignition of the fuel and air supplied to the selected one or more of the plurality of cylinders, the improvement comprising:

a microprocessor system including memory means for storing data representative of look-up tables of control data and stored programs for implementing predetermined control laws, said microprocessor system being responsive to the detection of various engine-operating parameters for initiating one or more of said stored programs for implementing predetermined control laws and outputting at least one of said first and second computed command signals for controlling the relative supply of fuel and air to the engine;

oxygen sensing means including an oxygen sensor, said means disposed at least partially within the exhaust system of the internal combustion engine and operable for detecting the oxygen content and therefore the relative air-fuel ratio existing therein and outputting a sensor signal indicative thereof;

means for generating an oxygen sensor test signal at periodic intervals such that said sensor test signal interval represents a small portion of the overall oxygen sensor operation;

means responsive to said oxygen sensor test signal for applying a test current to said oxygen sensor;

means responsive to said test current for measuring the impedance of said oxygen sensor to determine the temperature condition of the sensor and for generating an oxygen sensor "inhibit" signal when the sensor impedance is too high indicating a cold oxygen sensor; and means for utilizing the time between test signal intervals of said overall oxygen sensor operation for reading oxygen sensor output signals and processing same in the absence of said oxygen sensor inhibit signal, said microprocessor system being responsive to the presence of said oxygen sensor inhibit signal for disregarding the oxygen sensor output signals until, at some subsequent oxygen sensor test signal interval, the sensor impedance drops to indicate an active oxygen sensor thereby terminating said oxygen sensor inhibit signal and outputting at least one of said first and second computed command signals for controlling the relative supply of fuel and air to the engine.

2. In an internal combustion engine system having intake means, an exhaust system, an engine block, a plurality of cylinders disposed in said engine block, a piston operatively mounted for reciprocal movement within each of said plurality of cylinders, means for selectively controlling the quantity of air supplied from said intake means to a selected one or more of said plurality of cylinders, means for selectively supplying a controlled quantity of fuel into a selected one or more of said plurality of cylinders to establish a predetermined air-fuel mixture in said exhaust system in response to the combustion of said supplied fuel and air in said cylinders, an oxygen sensor feedback system including oxygen sensing means operatively disposed at least partially within said exhaust system for measuring the relative air-fuel mixture of the gases contained therein and generating an oxygen sensor output signal indicative of either a "lean" air-fuel ratio measurement or a "rich" air-fuel ratio measurement, means responsive to said oxygen sensor output signal for generating properly amplified and shaped signals indicative of said lean and rich air-fuel ratio measurements and means responsive to said properly amplified and shaped signals for controlling at least one of said air supplying means and said fuel supplying means for controllably maintaining a predetermined desired air-fuel ratio in said internal combustion engine system in a closed loop manner, the improvement comprising:

means for generating an oxygen sensor test current for measuring the internal impedance of said oxygen sensor means as an indication of its operating temperature and generating a first test output signal indicative of a high impedance and therefore a "cold" oxygen sensor means whose output signal indicative of the measured air-fuel ratio in said exhaust system is relatively unreliable and a second test output signal indicative of a relatively lower oxygen sensor internal impedance and hence a "warm" oxygen sensor means whose output signal indicative of the measured air-fuel ratio in said exhaust system is relatively reliable;

means responsive to said first test output signal for generating an INHIBIT signal to prevent said oxygen sensor output signals indicative of said lean and rich measured air-fuel ratios from being used for control purposes and further responsive to said second test output signal for generating a SENSOR ACTIVE signal to enable said oxygen sensor output signals indicative of said lean and rich measured air-fuel ratios in said exhaust system to be used for feedback control purposes;

circuit means for preventing inter-reaction between said oxygen sensor output signals indicative of said lean and rich measured air-fuel ratios existing in said exhaust system and said oxygen sensor test output signals indicative of the reliability of said oxygen sensor means to avoid masking of the oxygen sensor output signals by said test output signals; and selectively operable switching means for periodically generating said test current on a sampling basis wherein the duty cycle of said test current is relatively small compared to the overall operation of said oxygen sensor feedback system.

3. In an internal combustion engine system of claim 2 wherein said means for generating an oxygen sensor test current includes a charge pump operatively coupled between a source of potential and a voltage output node, a large valued resistive means for selectively controlling the value of said test current supplied to said oxygen sensor means, and means operatively coupling said voltage output node to said resistive means for applying a voltage potential to said resistive means for generating said oxygen sensor test current.

4. In an internal combustion engine system of claim 3 wherein said means for operatively coupling said voltage output node to said resistive means includes a first normally non-conducting switching means responsive to a predetermined level of potential developed at said voltage output node for switching to a conductive state and supplying the voltage developed at said voltage output node to said resistive means for forming a switched current source for periodically generating said oxygen sensor test current.

5. In an internal combustion engine system of claim 4 further including a second normally-conductive switching means operatively coupled between said voltage output node and ground for grounding said output node, said switching means being responsive to a gated control signal for switching to a non-conductive state and allowing said charge pump to develop said predetermined level of potential at said voltage output node and thereby switching said first switching means to a conductive state to generate said oxygen sensor test current.

6. In an internal combustion engine system of claim 5 further including means for receiving said oxygen sensor test output signal and temporarily storing same for indicating the reliablity of said oxygen sensor output signals until a new oxygen sensor test is made, said receiving means being responsive to said gated control signal for enabling same to receive a new test output signal and to store the new test output signal until the next periodic oxygen sensor test is made.

7. In an internal combustion engine system of claim 6 further including means for generating at least one control command requesting that one of said periodic oxygen sensor tests be initiated, logical gating means responsive to said at least one control command for generating and latching said gated control signal to render said second switching means non-conductive to enable said predetermined level of potential to develop at said voltage output node and rapidly gate said first switching means to a conductive state for applying the potential developed at said voltage output node to said resistive means for generating said oxygen sensor test current on a periodic sample-type basis and for enabling said test output signal receiving means to receive and temporarily store said oxygen sensor test output indicative of the relative reliability of said oxygen sensor output signals, said logical gating means being responsive to the receipt of a signal indicative of the end of an engine revolution for unlatching said gated control signal to render said second switching means conductive to again ground said voltage output node and terminate the generation of said oxygen sensor test current and to disable said receiving means while temporarily storing the last oxygen sensor test output signal to indicate the relative reliability of said oxygen sensor output signal until the next periodic oxygen sensor test is conducted.

8. In an internal combustion engine system of claim 7 wherein said oxygen sensor means includes two separate and distinct oxygen sensors, one for each bank of said exhaust system, said resistive means includes first and second resistors operatively coupled to said first and second oxygen sensors respectively, said first switching means includes first and second transistors whose current-carrying electrodes connect the common voltage output node to said first and second resistors respectively, said first and second transistors being switched to a conductive state in response to the attainment of said predetermined level of potential at said voltage output node for applying said predetermined level of potential to said first and second resistors respectively for generating first and second oxygen sensor test currents on a periodic basis for sampling said first and second oxygen sensors respectively.

9. In a system employing at least one oxygen sensor for monitoring the relative air-fuel mixture existing in the exhaust system of an internal combustion engine and generating a first oxygen sensor output signal at a first general voltage level if the measured air-fuel mixture is "lean" of stoichiometric and a second oxygen sensor output signal at a second general voltage level if the measured air-fuel mixture is "rich" of stoichiometric, said system including computer means for programmably-generating a plurality of command signals and at least one computer-generated control signal for selectively controlling the quantity of fuel and air combusted in said engine and therefore the air-fuel mixture existing in said exhaust system, said sensor being characterized in that its internal impedance increases as its temperature decreases until at some "cold" temperature below 300° Centigrade, said oxygen sensor output signal from said cold sensor becomes unreliable for use in generating feedback control signals and the like, oxygen signal conditioning means for amplifying and shaping said first and second oxygen sensor output signals and generating corresponding "lean" and "rich" signals indicative of said measured air-fuel mixture for transmission to said computer means, means for sampling said oxygen sensor output signal a predetermined number of times for each engine revolution and generating said lean and rich signals in response to said periodic sampling, the improvement comprising means for periodically generating an oxygen sensor test current having a relatively short duration for testing the impedance of said oxygen sensor to determine if it is in a cold state to generate a "cold state" signal indicating that said oxygen sensor output signal is relatively unreliable or a "operational state" signal indicating that said oxygen sensor output signal is relatively reliable and may be used for feedback control purposes, means responsive to the testing of said oxygen sensor for generating a test output state signal indicative of said "cold" and said "operational" states, means responsive to at least one of said plurality of program-generated command signals for generating a switching signal and enabling the periodic generation of said oxygen sensor test current, storage means for receiving the previously generated test output state signal and storing same until the next periodic oxygen sensor test is made for indicating whether said tested oxygen sensor is in said "cold" state or said "operational" state to indicate to said computer means the unreliability or reliability of said oxygen sensor output signals, respectively, and logic means responsive to said switching signal and to another of said plurality of program-generated command signals for enabling said storage means to receive and store a new test output state signal on a sample-type basis.

10. In a system employing at least one oxygen sensor for monitoring the relative air-fuel mixture existing in the exhaust system of an internal combustion engine and generating a first oxygen sensor output signal at a first general voltage level if the measured air-fuel mixture is "lean" of stoichiometric and a second oxygen sensor output signal at a second general voltage level if the measured air-fuel mixture is "rich" of stoichiometric, said system including computer means for programmably-generating a plurality of command signals and at least one computer-generated control signal for selectively controlling the quantity of fuel and air combusted in said engine and therefore the air-fuel mixture existing in said exhaust system, said sensor being characterized in that its internal impedance increases as its temperature decreases until at some "cold" temperature below 300° Centigrade, said oxygen sensor output signal from said cold sensor becomes unreliable for use in generating feedback control signals and the like, oxygen signal conditioning means for amplifying and shaping said first and second oxygen sensor output signals and generating corresponding "lean" and "rich" signals indicative of said measured air-fuel mixture for transmission to said computer means, means for sampling said oxygen sensor output signal a predetermined number of times for each engine revolution and generating said lean and rich signals in response to said periodic sampling, the improvement comprising means for periodically generating an oxygen sensor test current having a relatively short duration for testing the impedance of said oxygen sensor to determine if it is in a cold state to generate a "cold state" signal indicating that said oxygen sensor output signal is relatively unreliable or a "operational state" signal indicating that said oxygen sensor output signal is relatively reliable and may be used for feedback control purposes, means responsive to the testing of said oxygen sensor for generating a test output state signal indicative of said "cold" and said "operational" states, wherein said means for programmably generating an oxygen sensor test current includes a voltage doubling charge pump circuit means coupled between a source of potential and a voltage node, normally-conductive semiconductor means having current-carrying electrodes operatively coupled between said voltage node and ground for normally grounding said voltage node to prevent the development of a predetermined voltage level thereat, said semiconductor means also having a control electrode operatively coupled to said means for generating a first switching signal, said semiconductor means being responsive to said first switching signal for switching to a non-conductive state to enable said charge pump means to quickly build up a predetermined voltage level at said voltage node, resistive means for acting as a periodically-triggered current source whenever a source of potential is applied thereto to generate said oxygen sensor test current and supply same to said oxygen sensor, and second normally nonconductive semiconductor means having current-carrying electrodes operatively coupled between said source of potential and said resistive means, and a control electrode operatively coupled to said voltage node, said second semiconductor means being responsive to the attainment of said predetermined voltage level at said voltage node for rapidly switching to a conductive state and applying said source of potential to said resistive means for generating said oxygen sensor test current on a periodic sampling-type basis.

* * * * *